(No Model.)
T. GOLDEN.
HORSE BOOT.
No. 336,105. Patented Feb. 16, 1886.
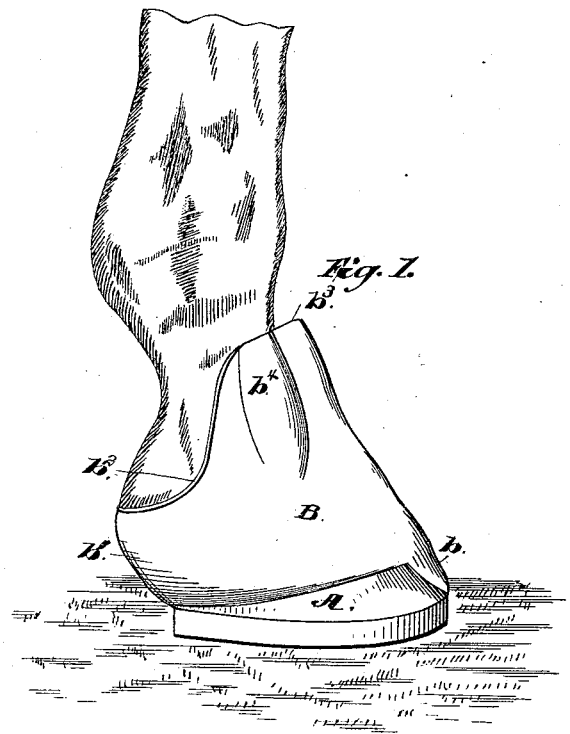
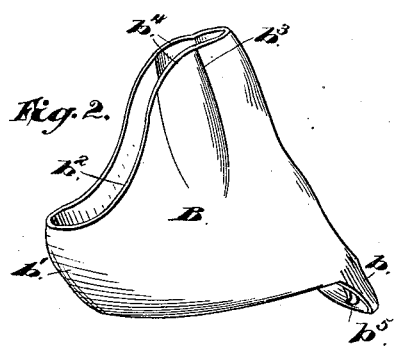
Witnesses:
Edward L. Mills.
Charles S. Hyer.
Inventor:
Thomas Golden.

UNITED STATES PATENT OFFICE.

THOMAS GOLDEN, OF NEW YORK, N. Y.

HORSE-BOOT.

SPECIFICATION forming part of Letters Patent No. 336,105, dated February 16, 1886.

Application filed December 18, 1885. Serial No. 186,022. (No model.)

*To all whom it may concern:*

Be it known that I, THOMAS GOLDEN, a citizen of the United States, residing at New York, in the county of New York, State of New York, have invented certain new and useful Improvements in Horse-Boots, of which the following is a specification, reference being had therein to the accompanying drawings.

My invention relates to speeding or scalping boots, made of india-rubber or other elastic material, for horses; and it consists in the construction and arrangement of the same, which will be more fully hereinafter described, and definitely pointed out in the claims.

One object of my invention is to provide a boot for the hind feet of a horse, which is molded of india-rubber in one piece, and adapted to be drawn on over the hoof of the animal, dispensing entirely with the use of straps and other means of securement, except the hook in the front lower projection of the boot.

A further object of my invention is to so construct this horse-boot that it will not only protect the hoof, but extends upward and covers the coronet, thereby preventing the hind feet from being cut or bruised by the forward feet while speeding the animal.

I attain these objects by the device illustrated in the accompanying drawings, wherein like letters of reference indicate similar parts in the several views, and in which—

Figure 1 is a side elevation of the lower portion of a limb of an animal with my improved speeding-boot applied thereto. Fig. 2 is a perspective view of the boot detached.

A indicates the hoof of an animal, over which the speeding-boot B is adapted to be drawn. The lower front portion of the boot B is formed with a projection, $b$, which covers a securing-hook, $b^5$, molded therewith, and that portion of the hind hoof which is always farthest forward in trotting or speeding. This projection $b$ extends downwardly to the bottom of the hoof A, and from where it joins the main portion of the boot the bottom edge of the said boot runs back on a gradual incline to the heel. By this construction a portion of the hoof which needs no protection is left uncovered, thus somewhat lightening the weight of the boot, and also providing for a saving of material in the making of the same. The rear of the boot, as at $b'$, is made cup-shaped, and covers the heel, and from thence it is cut or molded so that it will extend along at or about the top of the rear portion of the hoof until it reaches the point $b^2$, from whence it curves upward and forms an extension, $b^3$, which is adapted to cover the coronet and a portion of the ankle of the animal. This extension $b^3$ has corrugations or fluting $b^4$ formed therein, which extend downward to about the point where the said extension commences. The front portion of the boot conforms to the contour of the front of the hoof, and where the extension is formed the boot is not in direct contact with the ankle of the animal, but stands away therefrom and allows free circulation of the blood therein.

In applying this boot the hoof or foot of the animal is inserted through the top thereof, and being constructed of elastic material readily adapts itself to the form of the foot. No clamping or attaching device is needed to secure it in place when it is in position, except the securing-hook $b^5$, which is molded with and covered by the front downward projection, $b$, said hook $b^5$ being pressed slightly into the hoof to keep the boot in place, together with the cup-shaped heel $b'$, encircling the heel, keeping the boot in position, being aided by the elastic effort of the material of the boot pressing against the hoof.

By this construction of boot the cramping or binding of the ankle or foot is prevented, there being no securing means which, by their tightness, stop the free circulation of the blood through the lower portion of the limb of the animal.

In speeding a horse whose hind feet are protected by my improved boot injury derived from the clashing of the forward and hind feet is thrown upon the boot, which acts as a cushion and receives the blow and protects the foot.

The boot may be molded in any suitable manner known to the art, and is simple and cheap in its construction, and at the same time impervious to the decaying and stiffening action of water and mud, always preserving its elasticity.

It is obvious that many minor details in the construction of the boot might be made and substituted for those shown and described without in the least departing from the nature and principle of my invention.

I am aware that elastic horse-boots have heretofore been constructed and applied for different purposes, and such I do not broadly claim; but What I do claim as new, and desire to secure by Letters Patent, is—

1. As an improved article of manufacture, an elastic horse-boot molded in one piece of rubber or other analogous material, and adapted to be drawn over the foot of the animal, having a projection covering a securing-hook and the central part of the toe, from thence extending back on a slight incline to the rear of the foot, where a cup-shaped heel-covering is formed, and provided with an upwardly-projecting fluted extension covering the coronet, substantially as described, and for the purposes specified.

2. An elastic horse-boot adapted to be drawn over the foot of the animal, consisting of the portion B, having a projection, $b$, in the front portion of the boot inclosing a securing-hook, $b^5$, a cup-shaped heel-covering, $b'$, in the rear thereof, and a fluted extension or coronet-covering, $b^3$, in the forward upper part, substantially as described, and for the purposes specified.

In testimony whereof I affix my signature in presence of two witnesses.

THOMAS GOLDEN.

Witnesses:
 GARRETT J. MEAD,
 JAMES RUSSELL.